United States Patent
Gunalan et al.

(10) Patent No.: US 12,470,532 B2
(45) Date of Patent: Nov. 11, 2025

(54) SYSTEM AND METHOD FOR MULTI-PHY BASED MACsec OVER SECURE TUNNELS

(71) Applicant: Cisco Technology, Inc., San Jose, CA (US)

(72) Inventors: Anbu Chezhian Gunalan, San Jose, CA (US); Chennakesava Reddy Gaddam, Bengaluru (IN); Annu Singh, Bengaluru (IN); Wanli Wu, Sunnyvale, CA (US); SushilKumar G. Jhawar, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 78 days.

(21) Appl. No.: 18/594,727

(22) Filed: Mar. 4, 2024

(65) Prior Publication Data
US 2025/0220008 A1    Jul. 3, 2025

Related U.S. Application Data

(60) Provisional application No. 63/616,988, filed on Jan. 2, 2024.

(51) Int. Cl.
*H04L 9/40* (2022.01)
(52) U.S. Cl.
CPC ........ *H04L 63/0485* (2013.01); *H04L 63/029* (2013.01)
(58) Field of Classification Search
None
See application file for complete search history.

(56) References Cited

U.S. PATENT DOCUMENTS

| | | | |
|---|---|---|---|
| 8,707,020 B1* | 4/2014 | Lengyel | H04L 63/0428 370/252 |
| 2007/0133791 A1 | 6/2007 | Han et al. | |
| 2009/0307751 A1* | 12/2009 | Lin | H04L 63/162 709/245 |
| 2010/0174901 A1 | 7/2010 | Khermosh et al. | |
| 2017/0104851 A1 | 4/2017 | Arangasamy et al. | |
| 2019/0124055 A1* | 4/2019 | Guo | H04L 63/0471 |
| 2019/0173860 A1 | 6/2019 | Sankaran et al. | |
| 2023/0345307 A1* | 10/2023 | Forsman | H04W 84/00 |
| 2024/0224039 A1* | 7/2024 | Jiang | H04W 12/106 |

OTHER PUBLICATIONS

No stated author; IEEE Std 802.1AE-2018; 2018; retrieved from the Internet https://standards.ieee.org/IEEE/802.1AE/7154/; pp. 1-239, as printed. (Year: 2018).*

(Continued)

*Primary Examiner* — Michael W Chao
(74) *Attorney, Agent, or Firm* — Baker Botts L.L.P.

(57) ABSTRACT

In an embodiment, a method includes receiving a data packet and generating an optimized security tag based on a standard security tag by replacing an 8-byte optional secure channel identifier (SCI) of the standard security tag with 32 most significant bits of a 4 packet number, a 2-byte MAC Security Entities (SecY) engine identifier, and a 2-byte short SCI. The method further includes encrypting the data packet and transmitting the encrypted data packet comprising the optimized security tag to an electronic device.

20 Claims, 6 Drawing Sheets

(56) References Cited

OTHER PUBLICATIONS

No stated author; IEEE Std 802.1AEdk-2023; 2023; retrieved from the Internet https://standards.ieee.org/IEEE/802.1AEdk/10136/; pp. 1-207, as printed. (Year: 2023).*

No stated author; SSCI assignment for MACsec XPN Cipher Suites; 2016; retrieved from the Internet https://www.ieee802.org/1/files/public/docs2016/ck-seaman-ssci-maintenance0716v01.pdf; pp. 1-15, as printed. (Year: 2016).*

Hill C., et al., "Innovations in Ethernet Encryption (802.1AE—MACsec) for Securing High Speed (1-100GE) WAN Deployments", Cisco, White Paper, 2016, pp. 1-22.

\* cited by examiner

SYSTEM AND METHOD FOR MULTI-PHY BASED MACsec OVER SECURE TUNNELS

PRIORITY

This application claims the benefit, under 35 U.S.C. § 119 (e), of U.S. Provisional Patent Application No. 63/616,988, filed 2 Jan. 2024, which is incorporated herein by reference.

TECHNICAL FIELD

The present disclosure generally relates to network data encryption and decryption, and more specifically to systems and methods for network data encryption and decryption in secure tunnels.

BACKGROUND

IEEE 802.1AE (also known as MACsec) is a network security standard that operates at the medium access control (MAC) layer and defines connectionless data confidentiality and integrity for media access independent protocols. It is standardized by the IEEE 802.1 working group. The 802.1AE standard specifies the implementation of a MAC security entities (SecY) that are as part of the stations attached to the same LAN, providing secure MAC service to the client. The standard defines MACsec frame format identified by the EtherType 88-E5 carried as part of the Security Tag (SecTag). The SecTag additionally includes the parameters to validate the frame on receipt. Following the SecTag is the secure data field to carry the user data, optionally encrypted if confidentiality is provided. Finally the Integrity Check Value (ICV) field ensures the Integrity of the MACsec frame. The standard also defines secure connectivity associations that represent groups of stations connected via unidirectional secure channels (SC) each identified by Secure Channel Identifier (SCI). The standard further defines security associations (SA) identified by an Association Number (AN) within each secure channel. Each association uses its own key (SAK).

Every MACsec frame carries the 32 least significant bits (LSB) of the packet number (PN). The extended packet numbering (XPN) Cipher Suite uses a 64-bit PN, the 32 most significant bits (MSB) are recovered on receipt using PN recovery algorithm. MACsec uses 96-bit initialization vector (IV) as part of its Galois/Counter mode (GCM) encryption. For non-XPN, 96-bit IV may be derived from 32-bit packet number (PN) and 64-bit secure channel identifier (SCI). For XPN, 96-bit IV may be derived from 32-bit short SCI (SSCI) and 64-bit packet number (PN).

DESCRIPTION OF EXAMPLE EMBODIMENTS

Overview

According to an embodiment, a first electronic device may include one or more processors and one or more computer-readable non-transitory storage media comprising instructions that, when executed by the one or more processors, cause one or more components of the first electronic device to perform operations. The operations include receiving a data packet by the first electronic device. The operations also include generating an optimized security tag by the first electronic device based on a standard security tag by replacing an 8-byte optional secure channel identifier (SCI) of the standard security tag with 32 most significant bits of a packet number, a 2-byte MAC Security Entities (SecY) engine identifier, and a 2-byte short SCI. The operations additionally include encrypting the data packet by the first electronic device. The operations further include transmitting the encrypted data packet comprising the optimized security tag to a second electronic device by the first electronic device.

The first electronic device may include a plurality of first physical ports. In certain embodiments, transmitting the data packet is via any one of the plurality of first physical ports.

The second electronic device may include a plurality of second physical ports. In certain embodiments, the encrypted data packet is to be received at any one of the plurality of second physical ports.

The 32 most significant bits of the packet number and 32 least significant bits of the packet number may be accessible by any one of the plurality of second physical ports to derive the IV for decrypting the encrypted data packet.

The 32 most significant bits of the packet number and 32 least significant bits of the packet number may be accessible by any one of the plurality of second physical ports for decrypting the encrypted data packet without packet number synchronization between the plurality of second physical ports.

The plurality of first physical ports and the plurality of second physical ports may communicate via a plurality secure tunnels.

In certain embodiments, the operations include generating a security association to be shared among the plurality of second physical ports by the first electronic device.

The standard security tag may include 16-byte data field comprising at least 32 least significant bits of the packet number and the 8-byte optional SCI. In certain embodiments, the standard security tag and the optimized security tag have a same size.

The packet number may include 32 least significant bits of the packet number and the 32 most significant bits of the packet number. In some embodiments, the operations include decoupling the packet number from the security association by maintaining the packet number in a per-tunnel PN table keyed on the short SCI and an association number.

According to another embodiment, a method includes receiving a data packet by a first electronic device. The method also includes generating an optimized security tag by the first electronic device based on a standard security tag by replacing an 8-byte optional secure channel identifier (SCI) of the standard security tag with 32 most significant bits of a packet number, a 2-byte MAC Security Entities (SecY) engine identifier, and a 2-byte short SCI. The method additionally includes the steps of encrypting the data packet by the first electronic device. The method further includes the steps of transmitting the encrypted data packet comprising the optimized security tag to a second electronic device by the first electronic device.

According to yet another embodiment, one or more computer-readable non-transitory storage media may embody instructions that, when executed by a processor, cause the performance of operations. The operations include receiving a data packet by a first electronic device. The operations also include generating an optimized security tag by the first electronic device based on a standard security tag by replacing an 8-byte optional secure channel identifier (SCI) of the standard security tag with 32 most significant bits of a packet number, a 2-byte MAC Security Entities (SecY) engine identifier, and a 2-byte short SCI. The operations additionally include encrypting the data packet by the first electronic device. The operations further include transmitting the encrypted data packet comprising the optimized security tag to a second electronic device by the first electronic device.

Technical advantages of certain embodiments of this disclosure may include one or more of the following. Certain systems and methods described herein may enable MACsec based secure tunnel deployments by having a programmable mode of MACsec engine to carry entire 64-bit packet number without increasing the MACsec header size and ensure to derive the correct initialization vector for decryption based on the received header content itself. Certain systems and methods described herein may eliminate the need of 64-bit packet number synchronization for the received security associations that are programmed across multiple receiving SecY engines for MACsec encryption in multi-PHY use cases. Certain systems and methods described herein may further reduce the per-tunnel security association memory footprint by sharing one security association by all receiving channels while achieving secure tunnel scale. Sharing one security association for all receiving channels may increase the tunnel scale numbers because only a single security association is consumed to bring up a tunnel instead of one security association per peer port per tunnel.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In certain embodiments, a method for running secure tunnels using multi-PHY MACsec is provided. The method may include running secure tunnel sessions using MACsec between two Internet Protocol (IP) tunnel endpoints, where any of the endpoints can have one or more MACsec SecY engines for the data encryption managed by single control plane session. The method may also include allowing SecY engines to perform MACsec encryption and decryption in a multi-PHY tunnel deployment by allowing the receiver to derive the initialization vector (IV) directly from the received packet without relying on packet numbering (PN) sync across receiving channels.

A security tunnel may allow systems to do end-to-end MACsec encryption "over the top" of an IP network.

The security tunnel session may be served by multiple physical ports (multi-PHY) hosting independent SecY engines. As an example and not by way of limitation, IP on the tunnel, link aggregation group (LAG), or bundle interface and MACsec SecY engines may be hosted on the member ports.

Figure 1:
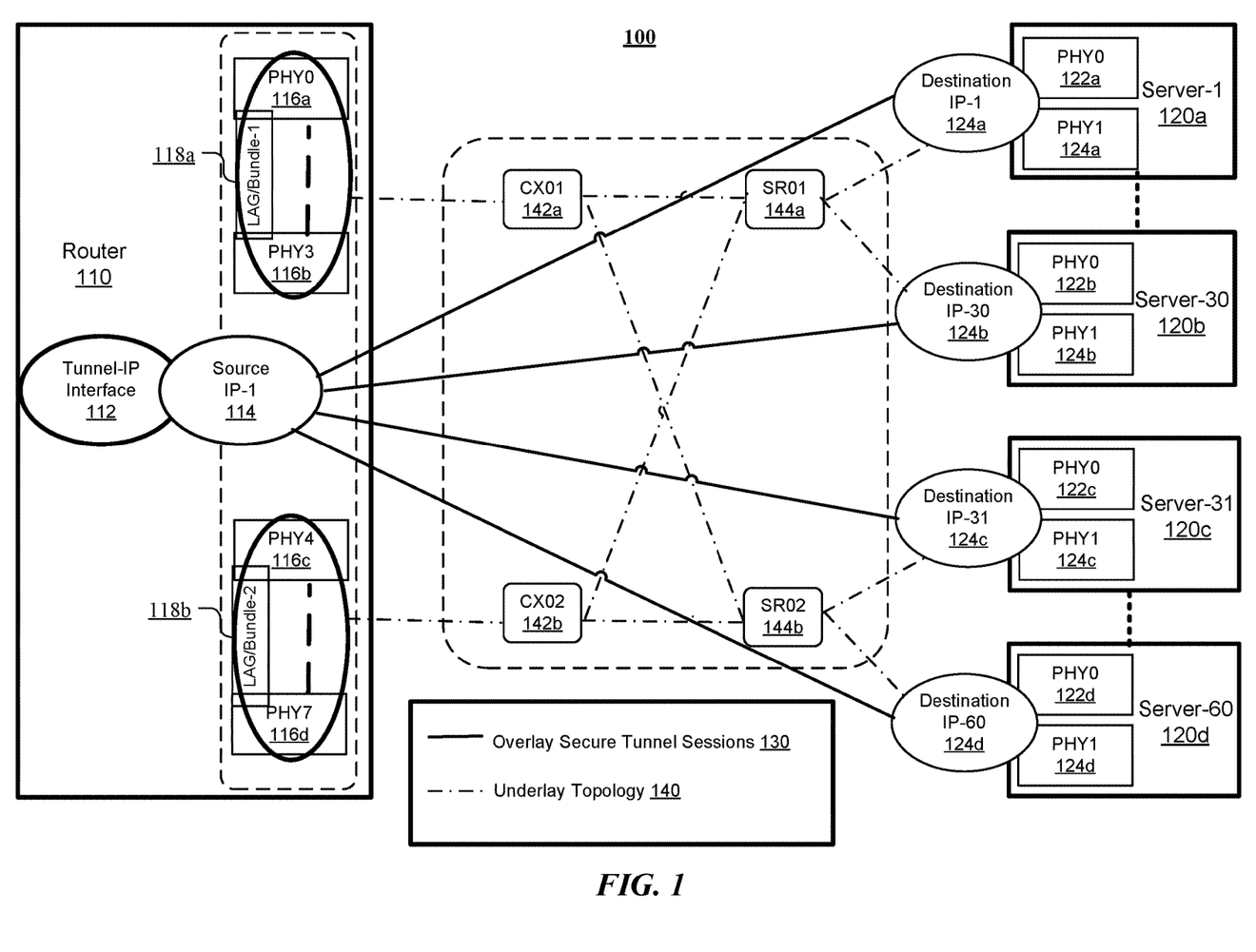
FIG. 1 illustrates a system comprising secure tunnels using multi-physical MAC security (multi-PHY MACsec), in accordance with certain embodiments.

FIG. 1 illustrates a system 100 comprising secure tunnels using multi-PHY MACsec, in accordance with certain embodiments. The system of FIG. 1 includes a router 110 and a plurality of servers 120. The router 110 includes a tunnel-IP interface 112 based on a source IP 114 (e.g., Source IP-1). The router 110 also includes multiple ports 116 (multi-PHY), which may be bundled as multiple LAGs/bundles 118. Each server 120 may include multiple ports 122 (multi-PHY). The ports 122 on each server 120 may use one IP for that server, e.g., destination IP-1 124a for server-1 120a, destination IP-30 124b for server-30 120b, destination IP-31 124c for server 31 120c, and destination IP-60 124d for server 60 120d. Security tunnels, e.g., overlay secure tunnel sessions 130, may be established between the source IP and destination IP. The secure tunnel sessions may be established over the underlay topology 140. As an example and not by way of limitation, the underlay topology 140 may be based on additional routing devices such as CX01 142a, CX02 142b, SR01 144a, and SR01 144b.

Secure tunnels as illustrated in FIG. 1 may be required to support line rate MACsec encryption over IP tunnels with multiple ports hosting independent SecY engines. With multiple underlay paths to the IP peers, encrypted traffic to secure tunnel peers may be received on any of the possible ports. As an example and not by way of limitation, a packet may be transmitted from any of the bundles, e.g., LAG/bundle-1 or LAG/bundle-2. Within each bundle, the packet may be transmitted from any of the ports (e.g., any of PHY0 to PHY3 within LAG/bundle-1). The transmitted packet may be received on any of the ports of the servers, e.g., any of PHY0 or PHY1 on server-1 through server-60.

Although FIG. 1 illustrates a particular number of routers, secure tunnels, and servers, this disclosure contemplates any suitable number of routers, secure tunnels, and servers. For example, the system may include more than one router.

Although FIG. 1 illustrates a particular arrangement of routers, secure tunnels, and servers, this disclosure contemplates any suitable arrangement of routers, secure tunnels, and servers.

Furthermore, although FIG. 1 describes and illustrates particular components, devices, or systems carrying out particular actions, this disclosure contemplates any suitable combination of any suitable components, devices, or systems carrying out any suitable actions.

In deployments of security tunnels, with extended packet numbering (XPN) cipher suites, the MACsec packets may be received on any of the ports, each of which may independently recover the 64-bit packet numbering (PN) as per the PN recovery algorithm. Since the packet number (PN) is part of the initialization-vector (IV) derivation, it may mandate to recover the same packet number (PN) by the receiver, which was used by the sender. Otherwise, packet decryption may fail. As an example and not by way of limitation, when all peer traffic is received by a particular SecY engine, the XPN algorithm may increment the higher 32-bit counter accordingly on that SecY engine. However, recovered PN on one SecY engine may be not known to other SecY engines. Because of IP underlay, it may be possible that continuous $2^{30}-1$ packets are not received by a SecY engine, which may lead to incorrect XPN recovery on other SecY engines, resulting in traffic decryption failures and traffic drop. With the current standard support, to achieve the PN recovery by a receiving security association (SA) in a multi-sender and multi-receiver use case, the receiving SA may need to update the local receive PN (RxPN) value to the highest RxPN value among all receiving engines. For throughput ports like 400G and 800G, PN synchronization may need to be completed within 1-2 seconds to avoid decryption failures.

As a result, supporting IP tunnels with multi-PHY cloud security encapsulation (CloudSec) (e.g., MACsec encapsulation carried over UDP header) may face a technical challenge of XPN recovery. To address the technical challenge of XPN recovery, the embodiments disclosed herein may provide MACsec header interpretation updates for XPN cipher suites with no change in SecTAG size.

A security tag (SecTAG) is of 8 (or) 16 bytes, comprising 2-byte field of MACsec EtherType, 1-byte field of transmission configuration indicator (TCI) and association number (AN), 1 byte field of short length (SL), 4-byte field of packet number (PN, least significant 32 bits if Cipher Suite uses extended packet numbering) and an optional 8-byte field of Secure Channel Identifier (SCI).

As per IEEE standard, SCI is an 8-byte optional field in SecTAG for point-to-point links and is mandatory when connectivity association (CA) comprises 3 or more security channels.

Figure 2:
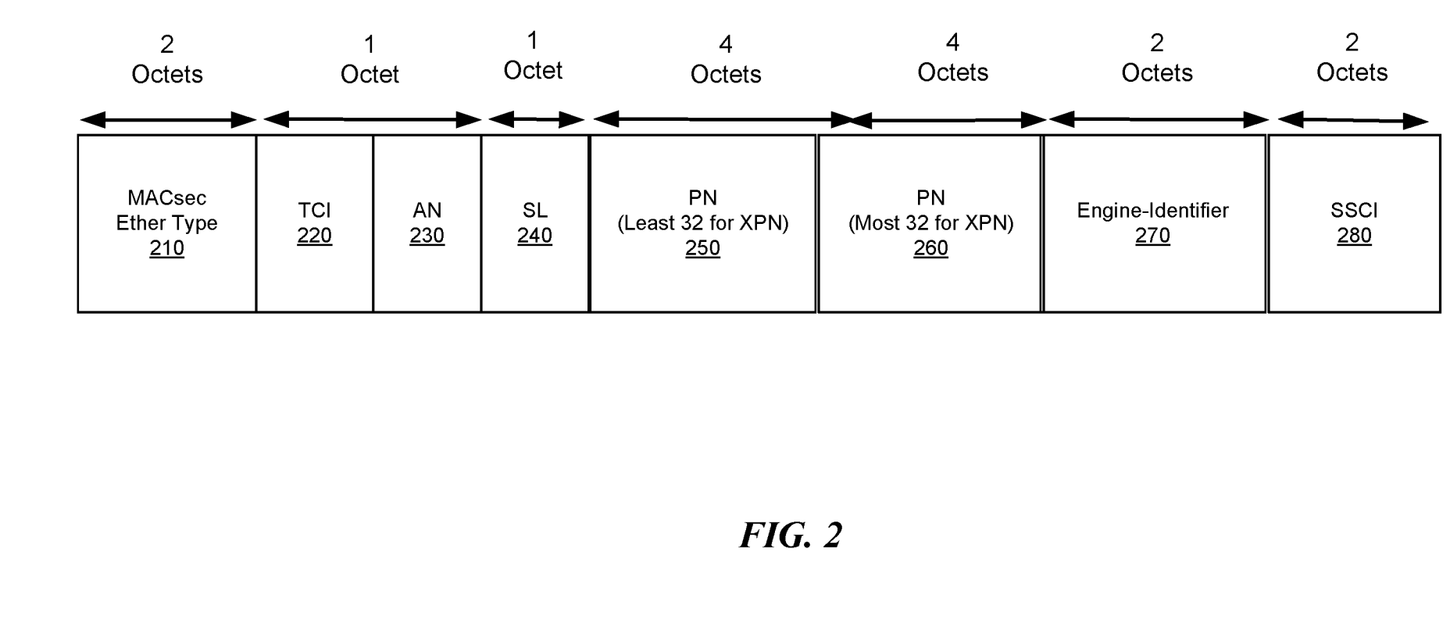
FIG. 2 illustrates a security tag (SecTAG), in accordance with certain embodiments.

For SecY engine operating in multi-PHY MACsec mode, the embodiments disclosed herein utilize the 8-byte SCI field to provide MACsec header interpretation updates with no change in SecTAG size. FIG. 2 illustrates a SecTAG 200, in accordance with certain embodiments. As illustrated in FIG. 2, the 2-byte field of MACsec Ether Type 210, 1-byte field of TCI 220 and AN 230, 1 byte field of SL 240, and 4-byte field of least 32-bit PN 250 may remain unchanged compared to a standard SecTAG. Particular embodiments may divide the 8-byte optional SCI into 4-byte PN (most significant 32 bits for XPN, i.e., higher 32-bit PN 260), 2-byte engine-identifier 270, and 2-byte short SCI (SSCI) 280. The 2-byte engine-identifier 270 may serve as an identifier for the packet transmit engine. The 2-byte SSCI 280 may be programmed in place of original SCI as part of secure channel programming (i.e., serving as SCI). The 2-byte SSCI 280 may be allocated and distributed by a key server.

In particular embodiments, SecY engine working in a multi-PHY operating mode may carry both lower-32 and higher-32 PN along with the SSCI and engine-identifier.

Supporting IP tunnels with multi-PHY cloud security encapsulation may face another technical challenge of tunnel scale. For the use case of multi-PHY CloudSec or MACsec encapsulation format, each transmitting port should send its SCI in the SecTAG. For each peer transmitting port, the receiving engine may program a unique receive (Rx) SA and additionally reserve an SA for refreshing the secret key (because the security association between two entities needs its secret key to be refreshed periodically or on event basis). Programming security associations proportional to the number of peer transmitting PHYs will bring down the tunnel scale. As an example and not by way of limitation, considering max SA/port is 1000, the number of PHYs per peer may be 10 then the number of security tunnels may be 1000/(10×2)=50.

As per IEEE standard 802.1AEbw-2013, each peer may independently sort the SCI list to determine the SSCI with numerically greatest SCI using the SSCI value 0x00000001, next to the greatest SCI using the SSCI value 0x00000002. However, to ensure there will not be any change in the SSCI of the already serving PHY member when any new member joins or leaves the secure tunnel, particular embodiments may utilize MACsec Key Agreement (MKA) protocol and a key server to manage and distribute SSCI allocation.

To improve tunnel scale, the same receiving security association (SA) may be shared by all receiving channels, which may also reduce the SA memory footprint. For replay protection with shared SA, particular embodiments may decouple packet number (PN) from SA and maintain it in a per-tunnel PN table keyed on SSCI and association number (AN). In addition, for multi-receiver use case, the periodic advertisement of the current transmit PN (TxPN) for every transmitting engine may be done through the MKA protocol (per SA) and the same may be imposed on every receiving SA across all SecY engines.

In particular embodiments, SecY engine may include a new programmable mode and/or define new MKA parameters to drive the SecTAG interpretation for the given SA.

Figure 3:
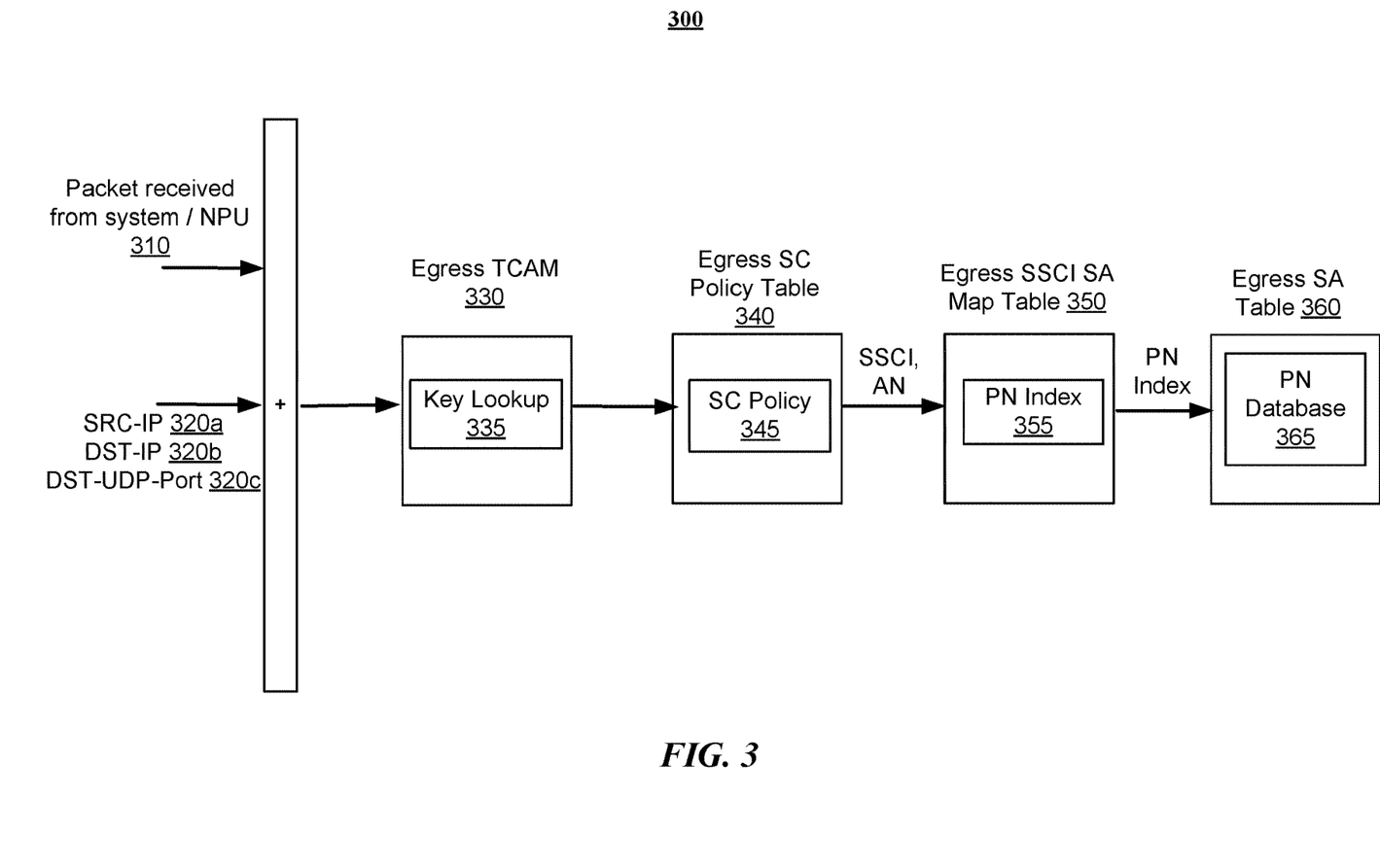
FIG. 3 illustrates an egress policy lookup, in accordance with certain embodiments.

FIG. 3 illustrates a flow diagram 300 for egress policy lookup, in accordance with certain embodiments. The flow diagram 300 may enable an electronic device (e.g., a router) to encrypt a packet based on a 64-bit packet number, in accordance with the embodiments of SecTAG 200 of FIG. 2. The electronic device may receive a packet 310 from system or network processor unit (NPU). The electronic device may determine a source (SRC)-IP 320a, destination (DST)-IP 320b, and DST-user datagram protocol (UDP)-Port 320c for the packet 310. The electronic device may take the packet 310, the SRC-IP 320a, the DST-IP 320b, and DST-UDP-Port 320c all together as input parameters when accessing an egress ternary content-addressable memory (TCAM) 330. Based on the input parameters, egress TCAM 330 may perform key lookup 335.

Key lookup 335 may involve accessing an egress secure channel (SC) policy table 340 to identify a secure channel policy 345 corresponding to the input parameters. In particular embodiments, a secure channel policy 345 may define rules to apply for a security association (SA). The secure channel policy 345 may also have entry for the security association. In particular embodiments, a security association may comprise a hardware flow where a hardware key may be programmed into it.

Once the SC policy 345 is determined, the electronic device may know which security association is needed to deliver a packet. Once the electronic device gets the security association, the packet number may be accounted for that egress independently. In particular embodiments, the egress is based on hardware and may be programmed in such a way that the electronic device may increment the packet number counter maintained in the PN database, attach the Security Tag and perform the encryption.

In particular embodiments, the electronic device may provide SSCI and AN to an egress SC policy table 350. The SC policy may provide SSCI and AN to an egress SSCI SA map table 350 to determine the SN index 355. With the PN index 355, the electronic device may access an egress SA table 360 to identify the packet number from a PN database 365. The electronic device may further encrypt the packet based on the packet number and transmit the encrypted packet.

Figure 4:
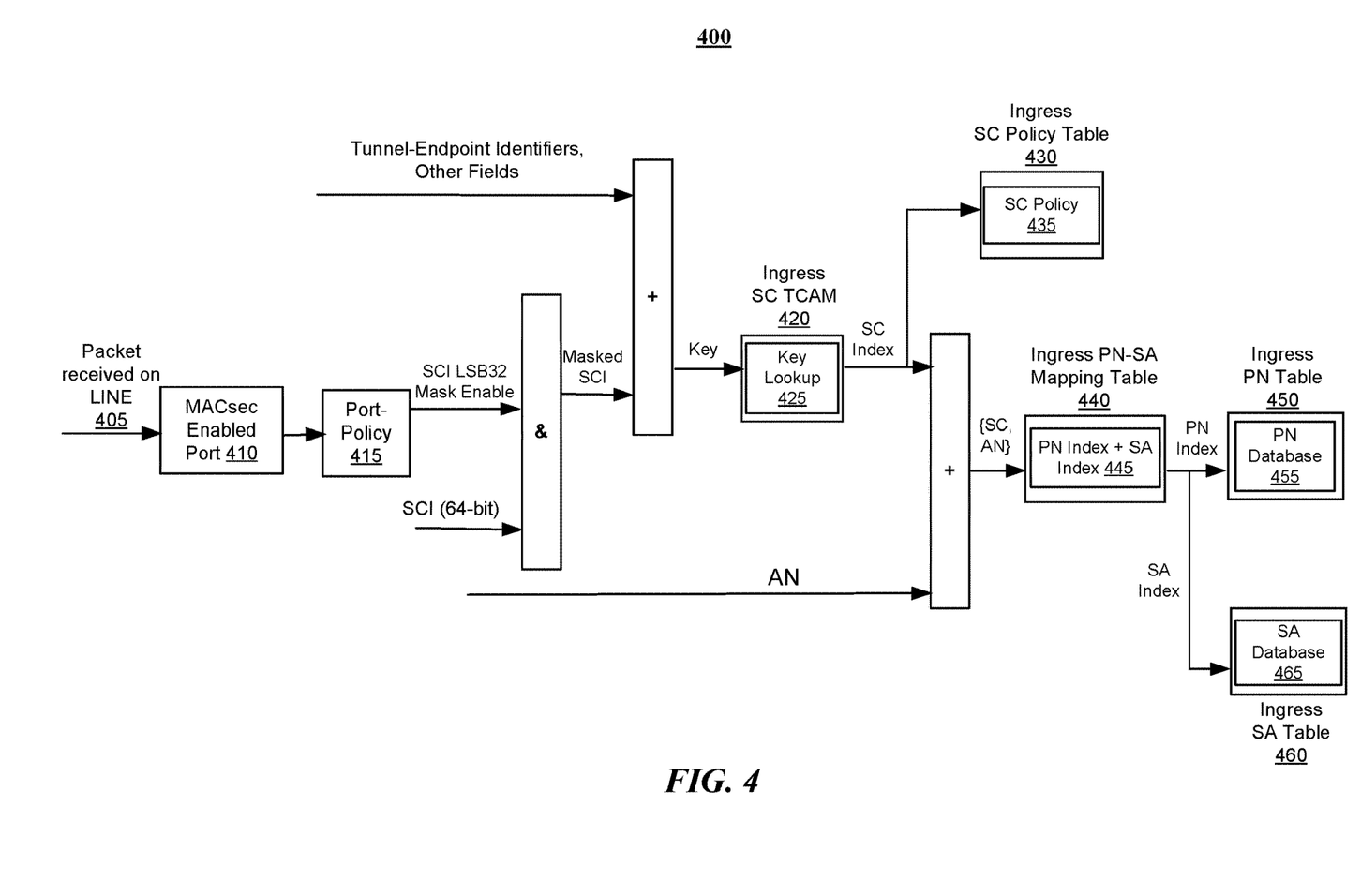
FIG. 4 illustrates an ingress policy lookup, in accordance with certain embodiments.

FIG. 4 illustrates a flow diagram 400 for ingress policy lookup, in accordance with certain embodiments. When an encrypted MACsec packet comes to a SecY engine, the secY engine may decrypt the packet based on the flow diagram 400. Different from conventional decryption flow, the flow diagram 400 may help increase security associations. With the flow diagram 400, particular embodiments may decouple SA and PN management so the memory footprint may be reduced. From a high level, the SecY engine may apply the SCI mask on the SCI field of the SecTAG 200 to determine the short SCI (SSCI). The SecY engine may then look up on tunnel endpoint identifiers, transmit engine-identifier, and masked SSCI to get the SC index. From the SC index, the SecY engine may get the SC policy. The SecY engine may look up on tunnel endpoints, SSCI, and AN to get the PN table entry. The SecY engine may look up on tunnel endpoints and AN to get the SA table entry. In particular embodiments, the SecY engine may retrieve 64-bit PN from the received packet. Lower 32-bit of the packet number may be read from the PN field 250 and the higher 32-bit of the packet number may be read from the PN field 260 in SecTAG 200. The SecY engine may perform replay protection check (if enabled) and update the received PN into the PN table. The SecY engine may additionally use PN to calculate the 96-bit IV for packet decryption. As an example and not by way of limitation, in XPN mode, the SecY engine may form the 96-bit IV by using low 32 bits of SCI (which includes engine-identifier 270 plus SSCI 280) and 64-bit PN.

According to the flow diagram 400, a SecY engine may receive a packet 405 on LINE (direction of traffic to show that traffic is coming from physical wire) at MACsec enabled port 410. The SecY engine may read parameters from the packet and use such parameters to determine a port-policy 415. The port-policy 415 may specify a SCI LSB32 mask to get the 32 least significant bits of SCI field, consisting of SSCI and Engine-ID to use. The SecY engine may also read SCI (64-bit). The SecY engine may integrate the SCI LSB32 mask enable and SCI (64-bit) to generate a masked SCI. The Sec Y engine may read other parameters such as tunnel-endpoint identifiers and other fields in the SecTAG 200 and combine them with the masked SCI to generate a key.

The SecY engine may use the key to perform a key lookup 425 in an ingress SC TCAM 420. The key lookup 425 may return an SC index. Based on the SC index, the Sec Y engine may identify a SC policy 435 from an ingress SC policy table 430. The SC policy 435 may be applied to the secure channel. In addition, the SecY engine may read an association number (AN) from the packet 405. The association number may indicate that in a particular secure channel what security association to look for to decrypt the packet. The SecY engine may use the SC index and AN together to search an ingress PN-SA mapping table 440 to identify the PN index and SA index 445.

The SecY engine may then use the PN index to search a PN database 455 in an ingress PN table 450. With the PN index, the Sec Y engine may identify a particular packet number to decrypt the packet. In particular embodiments, the SecY engine may use the SA index to search a SA database 465 in an ingress SA table 460 to identify a particular security association.

In some embodiments, to achieve replay protection in multi-receiver topology, the local RxPN value of each receiving SecY engine may be updated to the highest RxPN value among all receiving SecY engines. The implementation may send either periodic advertisement of the current TxPN for every transmitting engine in MKPDU and/or synchronize the RxPN value across all receiving SecY engines.

Figure 5:
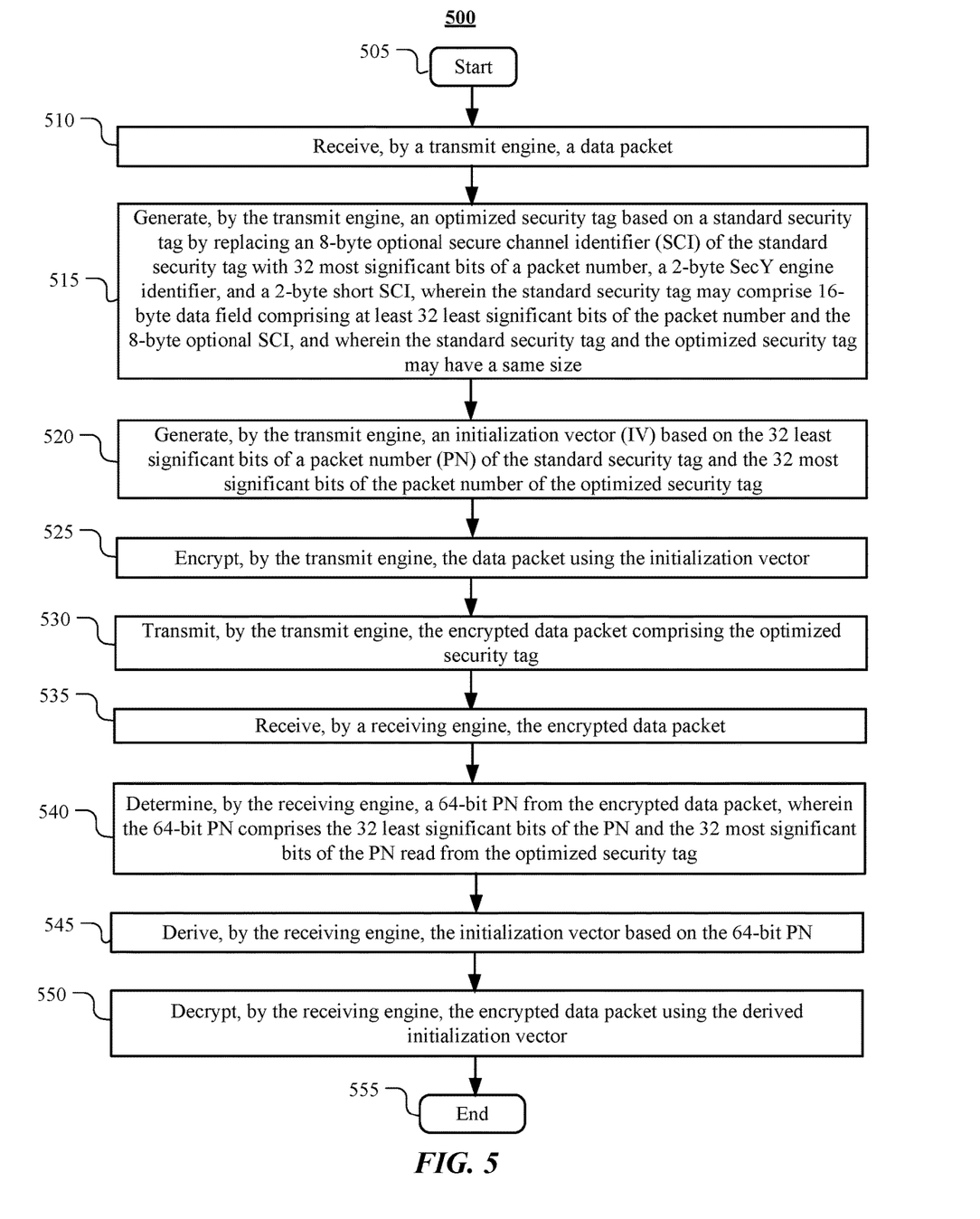
FIG. 5 illustrates a method for secure tunnels using multi-PHY MACsec, in accordance with certain embodiments.

FIG. 5 illustrates an example method 500 for secure tunnels using multi-PHY MACsec, in accordance with certain embodiments. In an embodiment, the steps of method 500 may be performed by a transmit engine and a receiving engine. The transmit engine may be associated with a first electronic device such as a router. The first electronic device may comprise multiple physical port with each hosting a transmit engine. The receiving engine may be a SecY engine that is associated with a second electronic device such as a server. The second electronic device may comprise multiple physical ports with each hosting a receiving engine. The method may start at step 505. At step 510, a transmit engine may receive a data packet.

At step 515, the transmit engine may generate an optimized security tag based on a standard security tag by replacing an 8-byte optional secure channel identifier (SCI) of the standard security tag with 32 most significant bits of a packet number, a 2-byte SecY engine identifier, and a 2-byte short SCI. The standard security tag may comprise 16-byte data field comprising at least 32 least significant bits of the packet number and the 8-byte optional SCI. In addition, the standard security tag and the optimized security tag may have a same size.

At step 520, the transmit engine may generate an initialization vector (IV) based on the 32 least significant bits of the packet number (PN) of the standard security tag and the 32 most significant bits of the packet number of the optimized security tag.

At step 525, the transmit engine may encrypt the data packet using the initialization vector.

At step 530, the transmit engine may transmit the encrypted data packet comprising the optimized security tag.

At step 535, the receiving engine may receive the encrypted data packet.

At step 540, the receiving engine may determine a 64-bit PN from the encrypted data packet. The 64-bit PN may comprise the 32 least significant bits of the PN and the 32 most significant bits of the PN read from the optimized security tag.

At step 545, the receiving engine may derive the initialization vector based on the 64-bit PN.

At step 550, the receiving engine may decrypt the encrypted data packet using the derived initialization vector.

At step 555, the method may end.

Although this disclosure describes and illustrates particular steps of method 500 of FIG. 5 as occurring in a particular order, this disclosure contemplates any suitable steps of method 500 of FIG. 5 occurring in any suitable order. Although this disclosure describes and illustrates an example method for secure tunnels using multi-PHY MACsec including the particular steps of method 500 of FIG. 5, this disclosure contemplates any suitable method for secure tunnels using multi-PHY MACsec including any suitable steps, which may include all, some, or none of the steps of method 500 of FIG. 5, where appropriate. Furthermore, although FIG. 5 describes and illustrates particular components, devices, or systems carrying out particular actions, this disclosure contemplates any suitable combination of any suitable components, devices, or systems carrying out any suitable actions.

Figure 6:
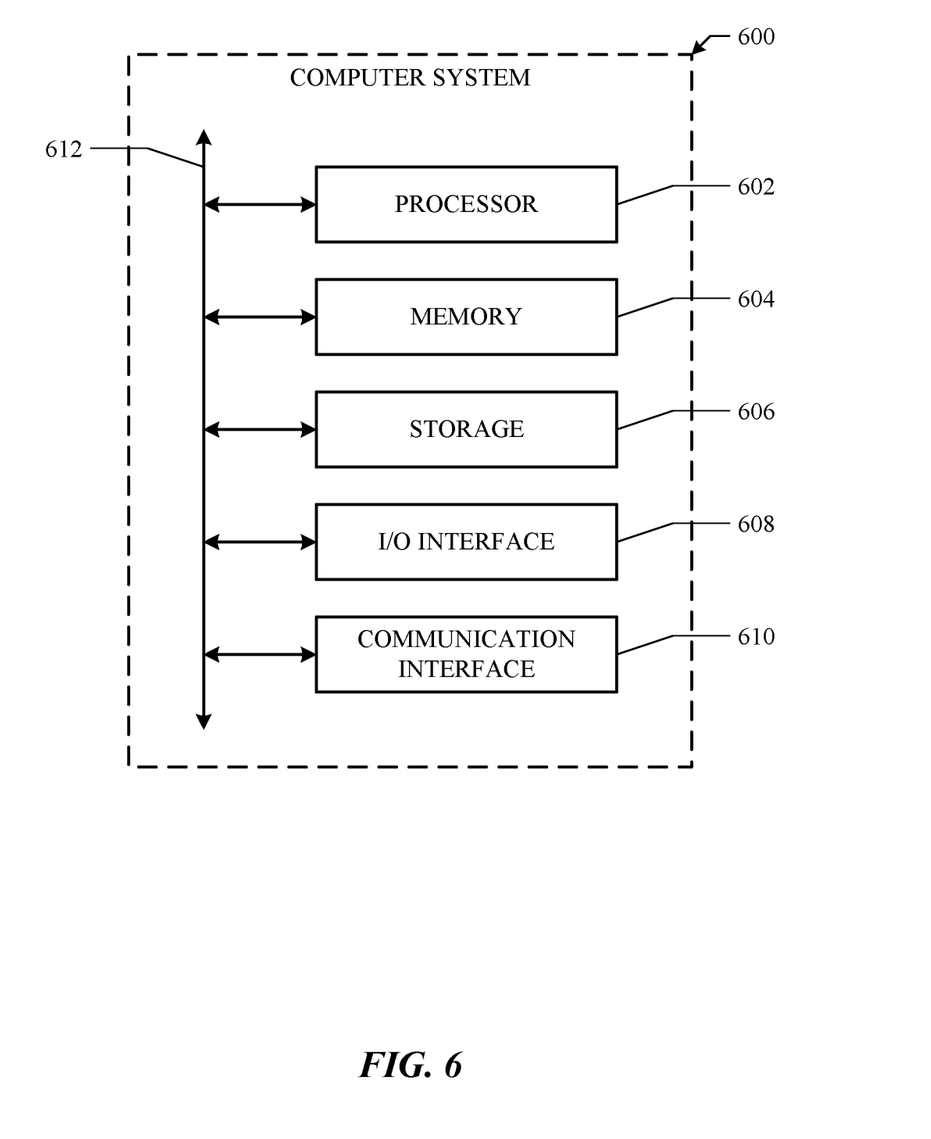
FIG. 6 illustrates a computer system, in accordance with certain embodiments.

FIG. 6 illustrates a computer system 600, in accordance with certain embodiments. In particular embodiments, one or more computer system 600 perform one or more steps of one or more methods described or illustrated herein. In particular embodiments, one or more computer system 600 provide functionality described or illustrated herein. In particular embodiments, software running on one or more computer system 600 performs one or more steps of one or more methods described or illustrated herein or provides functionality described or illustrated herein. Particular embodiments include one or more portions of one or more computer system 600. Herein, reference to a computer system may encompass a computing device, and vice versa, where appropriate. Moreover, reference to a computer system may encompass one or more computer systems, where appropriate.

This disclosure contemplates any suitable number of computer system 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer system 600; be unitary or distributed; span multiple locations; span multiple machines; span multiple data centers; or reside in a cloud, which may include one or more cloud components in one or more networks. Where appropriate, one or more computer system 600 may perform without substantial spatial or temporal limitation one or more steps of one or more methods described or illustrated herein. As an example, and not by way of limitation, one or more computer system 600 may perform in real time or in batch mode one or more steps of one or more methods described or illustrated herein. One or more computer system 600 may perform at different times or at different locations one or more steps of one or more methods described or illustrated herein, where appropriate.

In particular embodiments, computer system 600 includes a processor 602, a memory 604, a storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer system 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. A first electronic device, comprising:
one or more processors; and
one or more computer-readable non-transitory storage media comprising instructions that, when executed by the one or more processors, cause one or more components of the first electronic device to perform operations comprising:
receiving, by the first electronic device, a data packet;

generating, by the first electronic device, an optimized security tag based on a standard security tag by replacing an 8-byte optional secure channel identifier (SCI) of the standard security tag with 32 most significant bits of a packet number, a 2-byte MAC Security Entities (SecY) engine identifier, and a 2-byte short SCI;

encrypting, by the first electronic device, the data packet; and transmitting, by the first electronic device, the encrypted data packet comprising the optimized security tag to a second electronic device.

2. The first electronic device of claim 1, wherein:
the first electronic device comprises a plurality of first physical ports; and
transmitting the data packet is via any one of the plurality of first physical ports.

3. The first electronic device of claim 2, wherein:
the second electronic device comprises a plurality of second physical ports; and
the encrypted data packet is to be received at any one of the plurality of second physical ports.

4. The first electronic device of claim 3, wherein the 32 most significant bits of the packet number and 32 least significant bits of the packet number are accessible by any one of the plurality of second physical ports for decrypting the encrypted data packet.

5. The first electronic device of claim 3, wherein the 32 most significant bits of the packet number and 32 least significant bits of the packet number are accessible by any one of the plurality of second physical ports for decrypting the encrypted data packet without packet number synchronization between the plurality of second physical ports.

6. The first electronic device of claim 3, wherein the plurality of first physical ports and the plurality of second physical ports communicate via a plurality secure tunnels.

7. The first electronic device of claim 3, the operations further comprising:
generating, by the first electronic device, a security association to be shared among the plurality of second physical ports.

8. The first electronic device of claim 3, wherein the standard security tag comprises 16-byte data field comprising at least 32 least significant bits of the packet number and the 8-byte optional SCI.

9. The first electronic device of claim 8, wherein the packet number comprises the 32 least significant bits of the packet number and the 32 most significant bits of the packet number, and wherein the operations further comprise:
decoupling the packet number from the security association by maintaining the packet number in a per-tunnel PN table keyed on the short SCI and an association number.

10. The first electronic device of claim 1, wherein the standard security tag and the optimized security tag have a same size.

11. A method, comprising:
receiving, by a first electronic device, a data packet;
generating, by the first electronic device, an optimized security tag based on a standard security tag by replacing an 8-byte optional secure channel identifier (SCI) of the standard security tag with 32 most significant bits of a packet number, a 2-byte MAC Security Entities (SecY) engine identifier, and a 2-byte short SCI;

encrypting, by the first electronic device, the data packet; and transmitting, by the first electronic device, the encrypted data packet comprising the optimized security tag to a second electronic device.

12. The method of claim 11, wherein:
the first electronic device comprises a plurality of first physical ports; and
transmitting the data packet is via any one of the plurality of first physical ports.

13. The method of claim 12, wherein:
the second electronic device comprises a plurality of second physical ports; and
the encrypted data packet is to be received at any one of the plurality of second physical ports.

14. The method of claim 13, wherein the 32 most significant bits of the packet number and 32 least significant bits of the packet number are accessible by any one of the plurality of second physical ports for decrypting the encrypted data packet.

15. The method of claim 13, wherein the 32 most significant bits of the packet number and 32 least significant bits of the packet number are accessible by any one of the plurality of second physical ports for decrypting the encrypted data packet without packet number synchronization between the plurality of second physical ports.

16. The method of claim 13, further comprising:
generating, by the first electronic device, a security association to be shared among the plurality of second physical ports.

17. The method of claim 11, wherein the standard security tag and the optimized security tag have a same size.

18. A non-transitory computer-readable medium comprising instructions that are configured, when executed by a processor, to:
receive, by a first electronic device, a data packet;
generate, by the first electronic device, an optimized security tag based on a standard security tag by replacing an 8-byte optional secure channel identifier (SCI) of the standard security tag with 32 most significant bits of a packet number, a 2-byte MAC Security Entities (SecY) engine identifier, and a 2-byte short SCI;

encrypt, by the first electronic device, the data packet; and transmit, by the first electronic device, the encrypted data packet comprising the optimized security tag to a second electronic device.

19. The non-transitory computer-readable medium of claim 18, wherein:
the second electronic device comprises a plurality of second physical ports; and
the encrypted data packet is to be received at any one of the plurality of second physical ports.

20. The non-transitory computer-readable medium of claim 19, further comprising instructions that are configured, when executed by a processor, to:
generate, by the first electronic device, a security association to be shared among the plurality of second physical ports.

* * * * *